Aug. 17, 1965     H. W. SCOTT ETAL     3,201,576
FLUORESCENT LIGHTING FIXTURE

Original Filed May 19, 1960     15 Sheets-Sheet 1

INVENTORS.
HOWARD W. SCOTT &
WILLIAM H. HOUSTON
BY Brumbaugh, Free,
Graves & Donohue
their ATTORNEYS Aug. 17, 1965    H. W. SCOTT ETAL    3,201,576
FLUORESCENT LIGHTING FIXTURE
Original Filed May 19, 1960    15 Sheets-Sheet 2

INVENTORS.
HOWARD W. SCOTT &
WILLIAM H. HOUSTON
BY Brumbaugh, Free
Graves & Donohue
their ATTORNEYS INVENTORS.
HOWARD W. SCOTT &
WILLIAM H. HOUSTON
BY Brumbaugh, Free,
Graves & Donohue
their ATTORNEYS.

INVENTORS.
HOWARD W. SCOTT &
WILLIAM H. HOUSTON
BY
their ATTORNEYS.

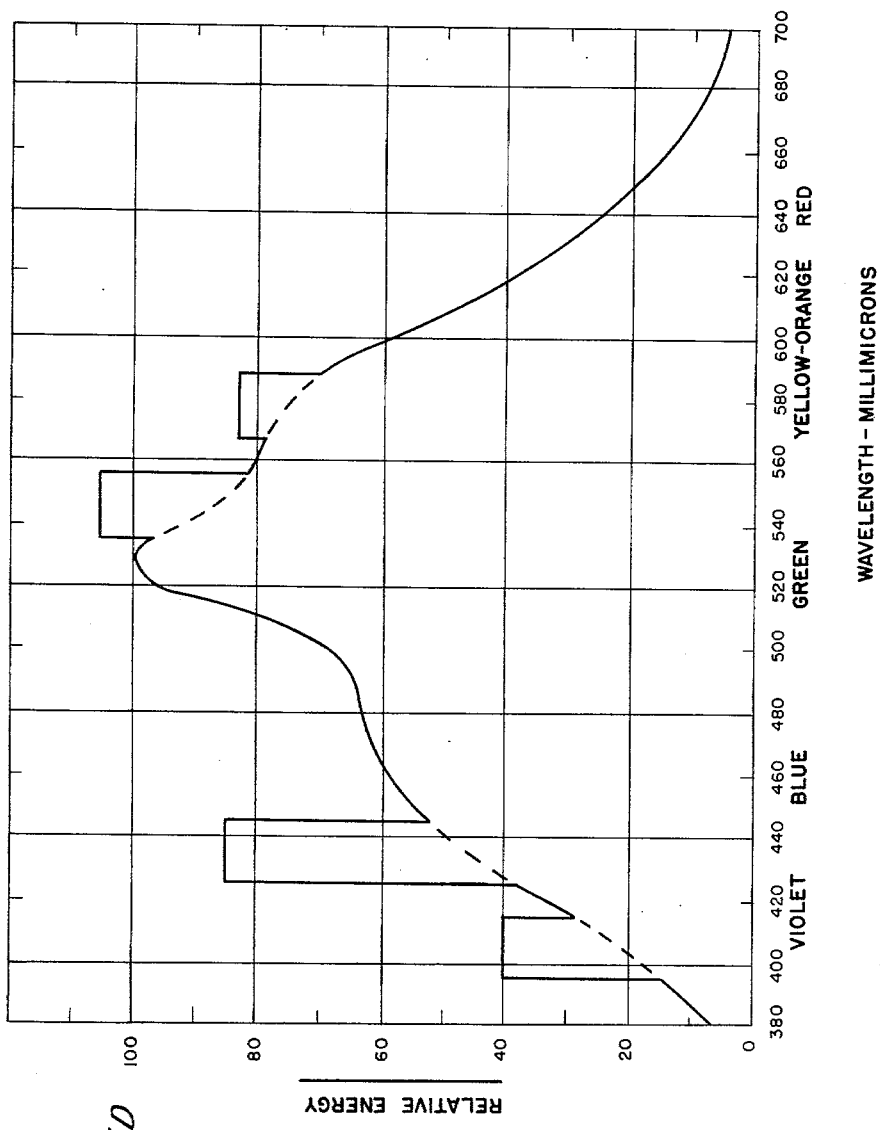

Aug. 17, 1965    H. W. SCOTT ETAL    3,201,576
FLUORESCENT LIGHTING FIXTURE
Original Filed May 19, 1960    15 Sheets-Sheet 11

INVENTORS.
HOWARD W. SCOTT &
WILLIAM H. HOUSTON
BY Brumbaugh, Free,
Graves & Donohue
their    ATTORNEYS

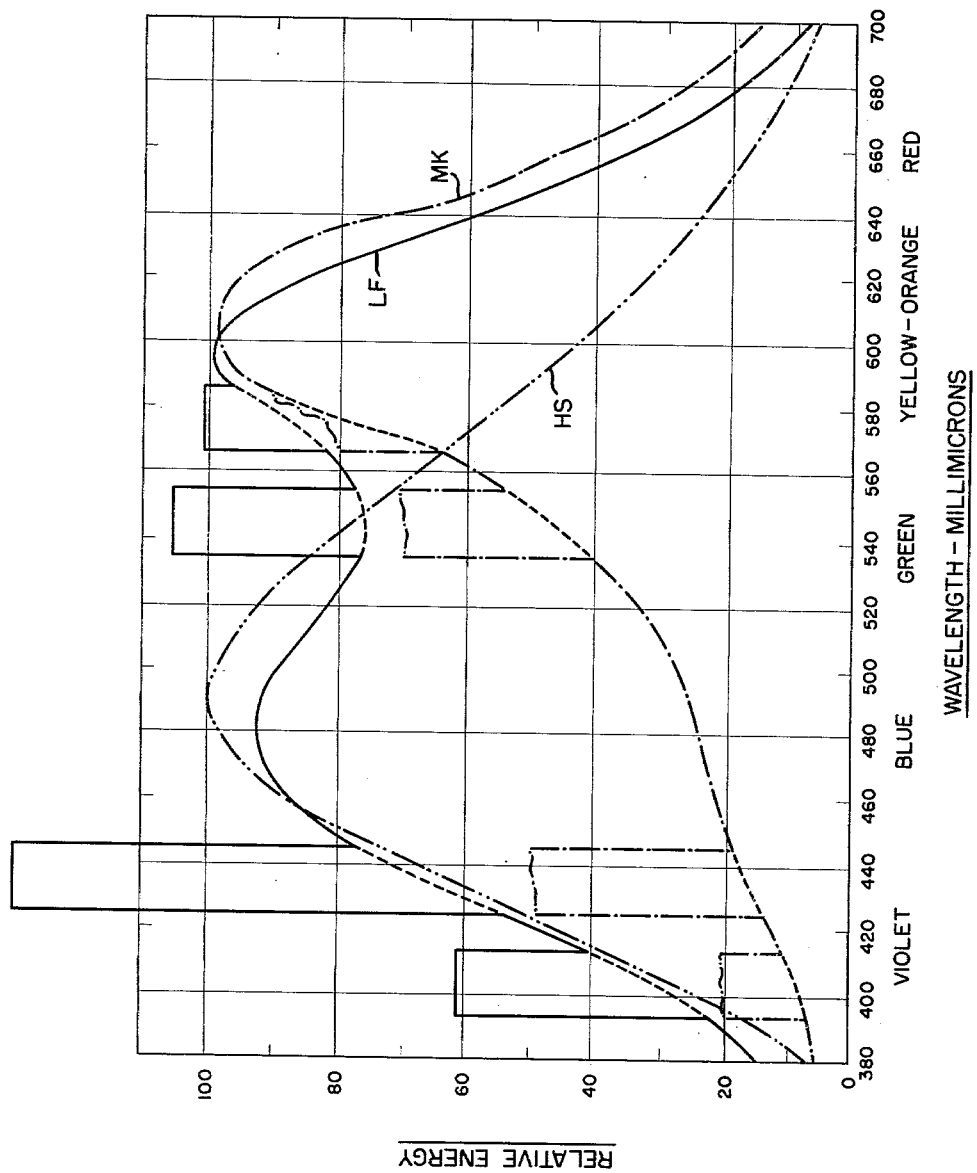

Aug. 17, 1965 H. W. SCOTT ETAL 3,201,576
FLUORESCENT LIGHTING FIXTURE
Original Filed May 19, 1960 15 Sheets-Sheet 13

INVENTORS.
HOWARD W. SCOTT &
WILLIAM H. HOUSTON
BY Brumbaugh, Free,
Graves & Donohue
their ATTORNEYS INVENTORS.
HOWARD W. SCOTT &
WILLIAM H. HOUSTON
BY Brumbaugh, Free,
Graves & Donohue
their ATTORNEYS United States Patent Office 3,201,576
Patented Aug. 17, 1965

3,201,576
FLUORESCENT LIGHTING FIXTURE
Howard W. Scott, Greenwich, Conn., and William H. Houston, Warren, Pa., assignors to Verilux Inc., New York, N.Y., a corporation of New York
Continuation of application Ser. No. 30,358, May 19, 1960. This application Nov. 19, 1964, Ser. No. 432,912
3 Claims. (Cl. 240—1.1)

This invention, generally, relates to apparatus for producing artificial light and, more particularly, to apparatus for producing daylight artificially. This application is a continuation of application Serial No. 30,358, filed May 19, 1960, now abandoned, which is, in turn, a continuation-in-part of our application Serial No. 744,698, filed June 25, 1958, now abandoned, and entitled "Lighting Fixture."

The act of "seeing" is dependent upon the existence of light. As long as the human eye is capable of perceiving an object with ease, the conscious requirements of the mind are satisfied. However, unless artificial light is reasonably comparable in spectral content or relative amounts of radiant energy at each wave length to the light produced naturally by the sun, it is known that effects adverse to the human body may be developed, such effects being, for example, eyestrain, nervousness, headaches or psychophysiological conditions.

Many aspects must be considered in the development of an artificial light source which will provide the quantity and quality of the artificial light required for many industrial and artistic purposes. In the development of artificial light, the principal concern in the past has been with the quantity of light produced, and light quality has received very little consideration. It is when the quantity of light is increased that its quality becomes particularly important to visual acuity. Light quality, in turn, is dependent on the mixing or blending of the different wave lengths of radiant light energy. Many fields require accurate perception for matching of colors and inasmuch as the ordinary artificial light presently available is not comparable to daylight, it is still customary to rely upon natural light for accurate perception. North sky daylight is usually regarded by artists and color technicians in the printing, textile and other fields as the ideal light.

Efforts have been made in the past to use so-called "daylight" fluorescent tubes to the end of simulating natural northlight. While such "daylight" tubes emit a light which in psychological terms can be said to be "whitish" in color, at the same time, it is quite apparent to the eye that such light is different in quality from natural northlight. The reason for this is that the spectral energy distribution curve for a "daylight" tube does not duplicate the spectral energy distribution curve for northlight.

Recognizing such deficiency in daylight tubes, workers in the prior art sought to supplement the S.E.D. curves for "daylight" tubes by combining such tubes in a fixture with fluorescent tubes of other types. The result of such combining was, however, to shift the quality of the overall light emitted by the fixture from the whitish appearing light characterizing "daylight" tubes to light having a more bluish cast, and this result was just the opposite of that which was ultimately desired, namely to eliminate the bluish quality which is generally associated with light emitted by fluorescent tubes, and which renders them unsatisfactory as substitutes for natural daylight.

It was necessary, therefore, for the prior art to override the shift toward the blue end of the color spectrum ensuing from the combining in one fixture of daylight tubes with the other fluorescent tubes. This was done by adding to such fluorescent tube combination a number of incandescent (i.e., tungsten filament) lamps which, inherently, are rich in spectral energy in the yellow-red end of the color spectrum. While this mixing together of fluorescent and incandescent light sources provided a better blend of spectral energies for daylight simulating purposes than could be obtained by the prior art combination of fluorescent tubes alone, such mixture of light sources in turn created a number of new disadvantages. For one thing, a fixture of unconventional design was required to accommodate both the fluorescent tubes and the incandescent light bulbs. Further, because of the inefficiency of incandescent lamps as light emitters relative to fluorescent lamps, fixtures employing mixed incandescent and fluorescent light sources inherently had lower ratio of lumens output/watts input than do all-fluorescent fixtures. Moreover, the high temperature at which incandescent bulbs operate created difficulties in the design of the fixture and lowered the efficiency thereof. To wit, in order to avoid overheating of the ballasts for the fluorescent tubes, special provisions had to be made for ventilating the fixture, and, also, the various light sources had to be spaced farther apart than would be required for an all-fluorescent fixture. This extra spacing reduced the output in lumens per square foot of the diffuser element for the fixture to a value below that which is attainable with good engineering practice in an all-fluorescent fixture. As another consideration, even with suitable ventilating and light source spacing, the prior art fixtures using mixed incandescent and fluorescent sources were subject to the disadvantage of a time fluctuation in the spectral energy content of the emitted light, such fluctuation being caused by changes in the temperature of the incandescent bulbs.

Finally, a fixture employing mixed fluorescent and incandescent light sources has a make-shift look and is otherwise unattractive in appearance.

In the prior art attempts to simulate daylight, it had been considered that, for color rendition purposes, the type of natural daylight which was "ideal" was clear and sunny northlight, i.e., light derived from the north sky on a 45° plane on a clear and sunny day. We have found, on the other hand, that in many instances, better color rendition is obtained under natural light derived from overcast north sky and known as overcast northlight. This latter type of northlight differs from clear and sunny northlight in that, physically speaking, it is richer in spectral energy at the yellow-red end of the color spectrum, and, subjectively speaking, it is therefore "warmer" in tone.

It is an object of this invention to provide a new and improved all-fluorescent apparatus for producing artificial light having the color spectrum balance of natural overcast northlight.

Another object of this invention is to provide an all-fluorescent apparatus for producing natural overcast northlight in a uniform, inexpensive and efficient manner.

A further object of this invention is to provide an all-fluorescent apparatus in which various wave lengths of radiant light energy are combined and blended to produce illumination which approximates overcast northlight in quality.

Generally, the objects of the invention are achieved by combining radiant light energies of predetermined characteristics from a plurality of light sources all of which are fluorescent light sources. To combine the various radiant light energies to produce artificial daylight, each of the light sources has a spectral energy distribution curve which is selected in relation to the respective curves of the other light sources employed so as to provide the optimum balance of wave lengths and intensities comparable with those of the selected natural overcast northlight conditions. In this manner, colors viewed with the new light source will appear much the same as when viewed in natural overcast northlight.

For a better understanding of the invention, reference may be had to the accompanying drawings, in which.

Figure 1:
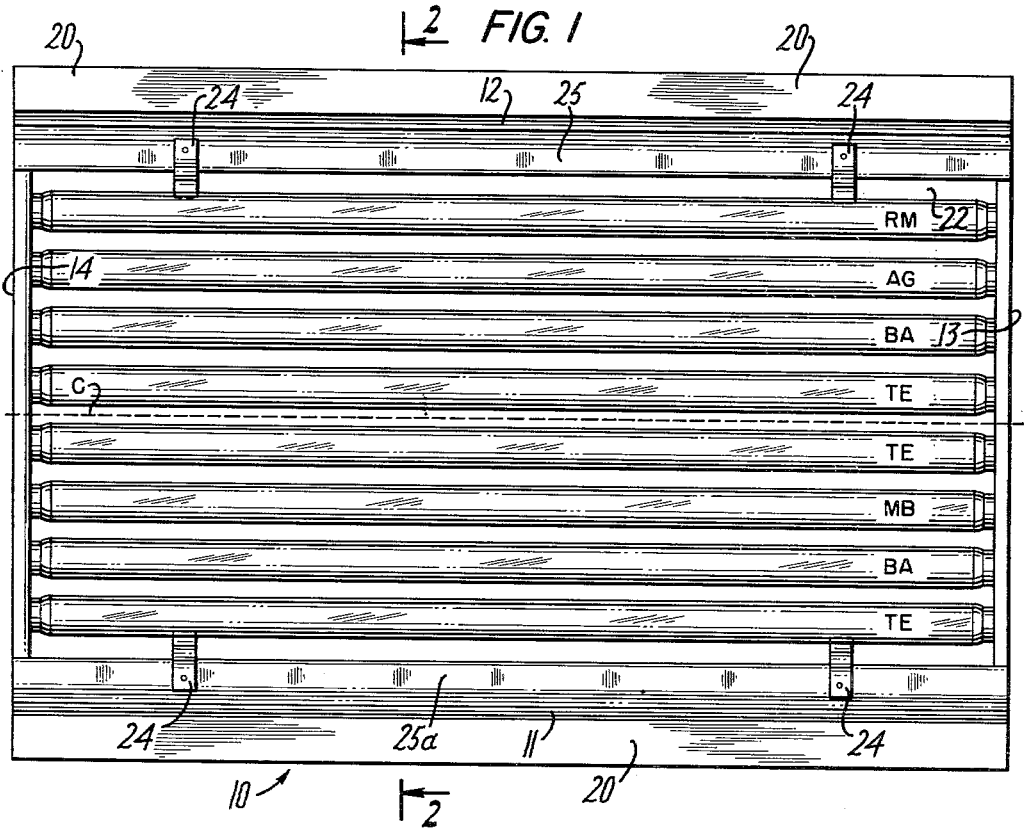
FIG. 1 is a view from underneath of a light fixture constructed and arranged according to the principles of the invention.
Figure 2:
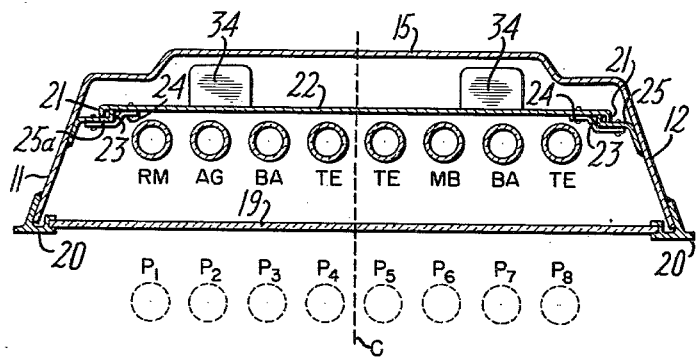
FIG. 2 is a side elevation view taken in cross section along the line indicated by the arrows 2—2 in FIG. 1.
Figure 3:
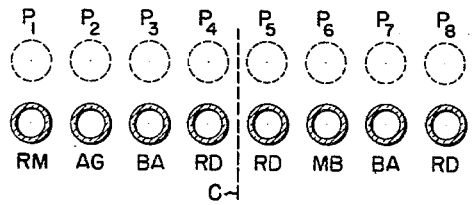
FIG. 3 is a modification of the light fixture shown in FIGS. 1 and 2.
Figure 4:
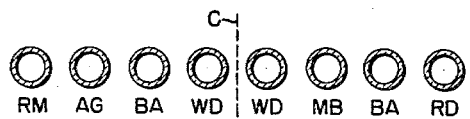
FIG. 4 is another modification of the light fixture shown in FIGS. 1 and 2.
Figure 8:
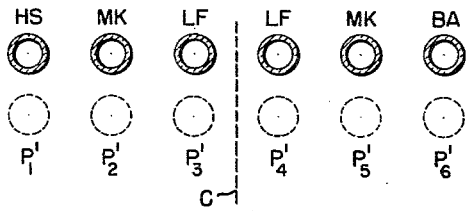
Figure 7A:
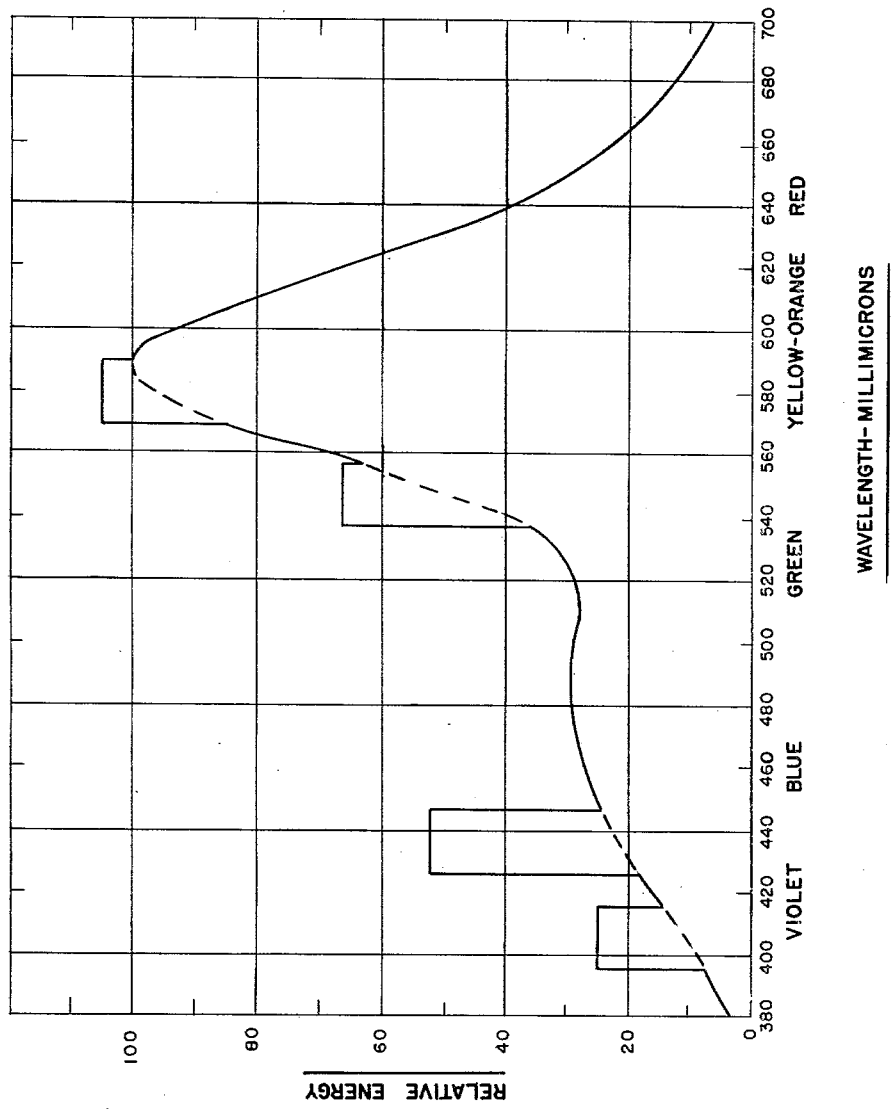
Figure 1B:
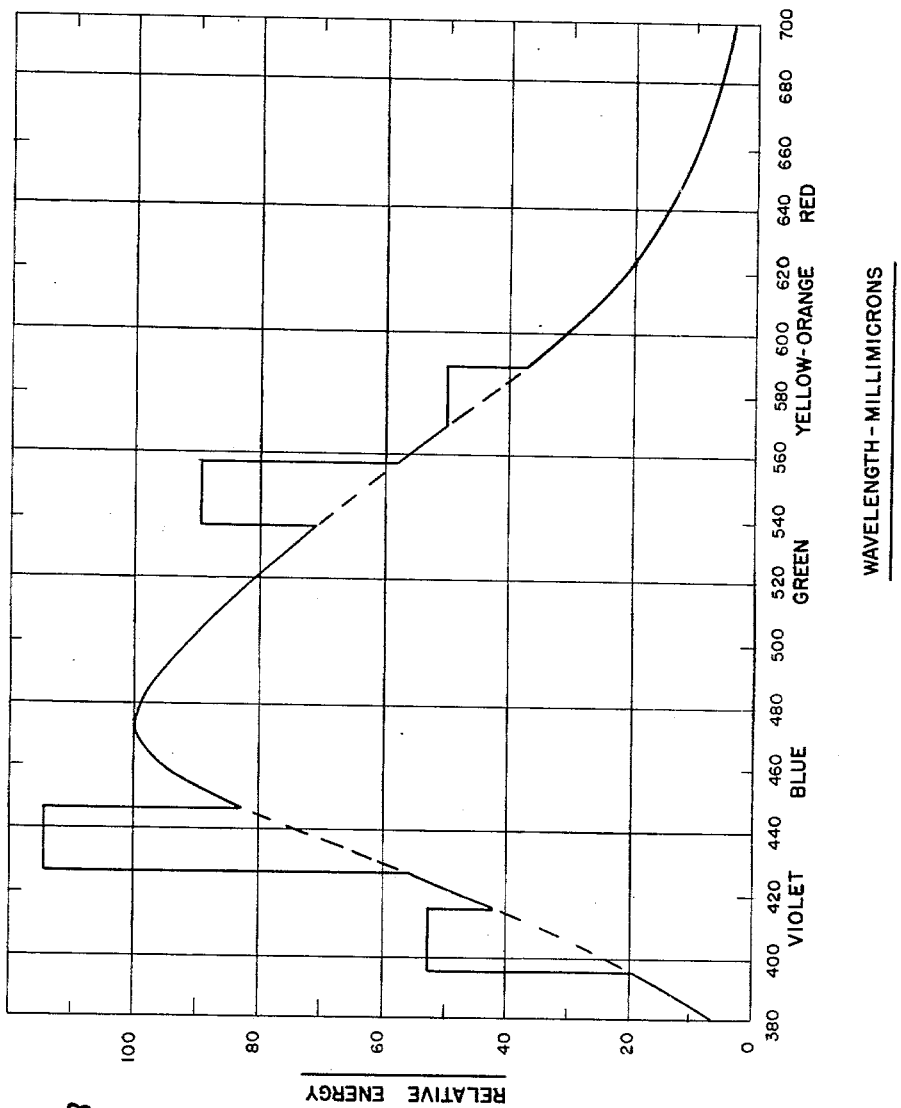
Figure 7C:
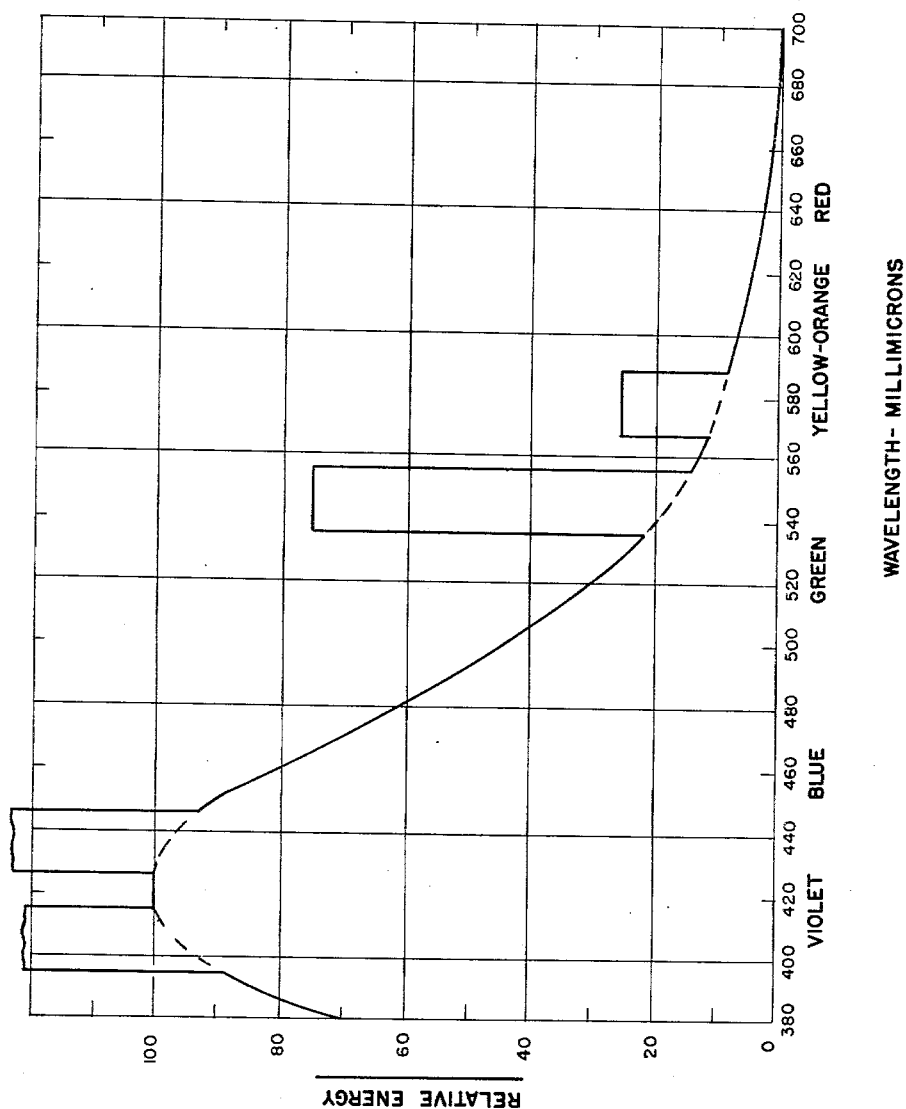
Figure 7E:
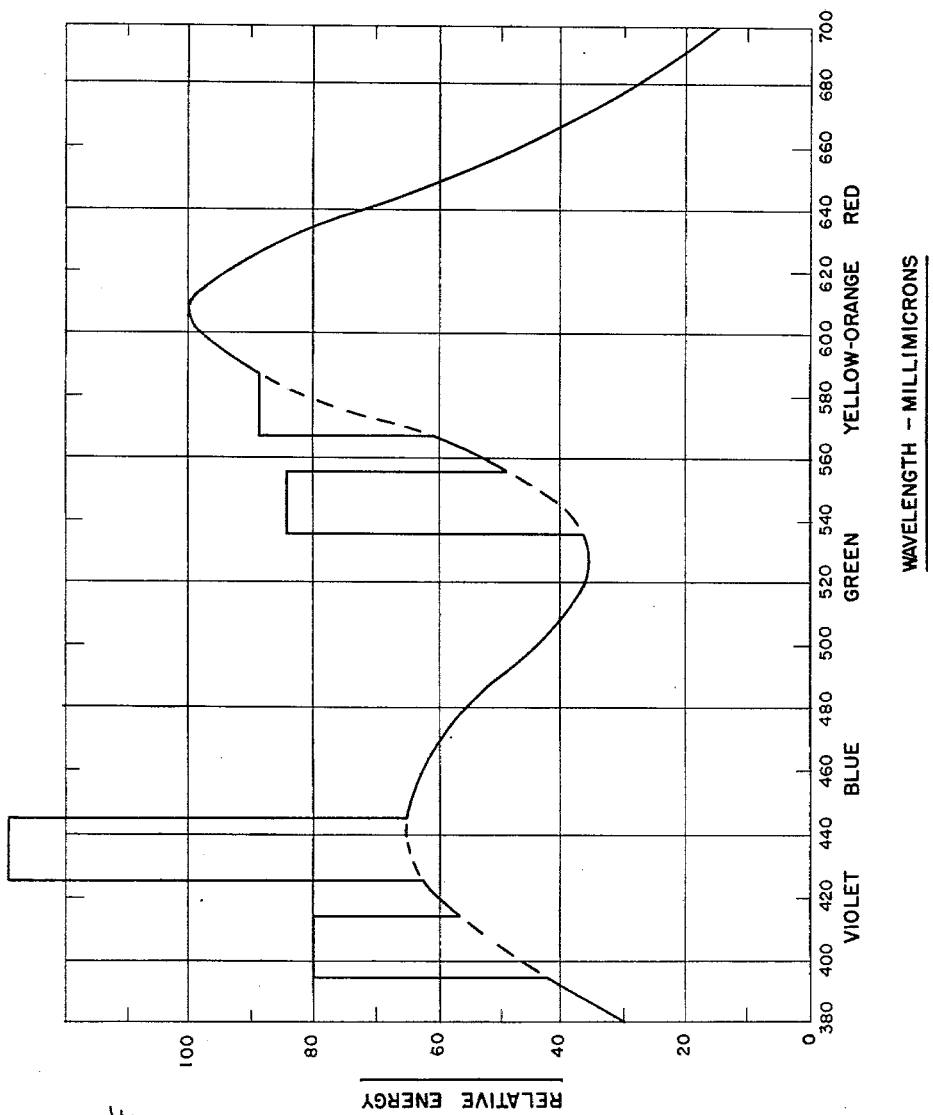
Figure 7F:
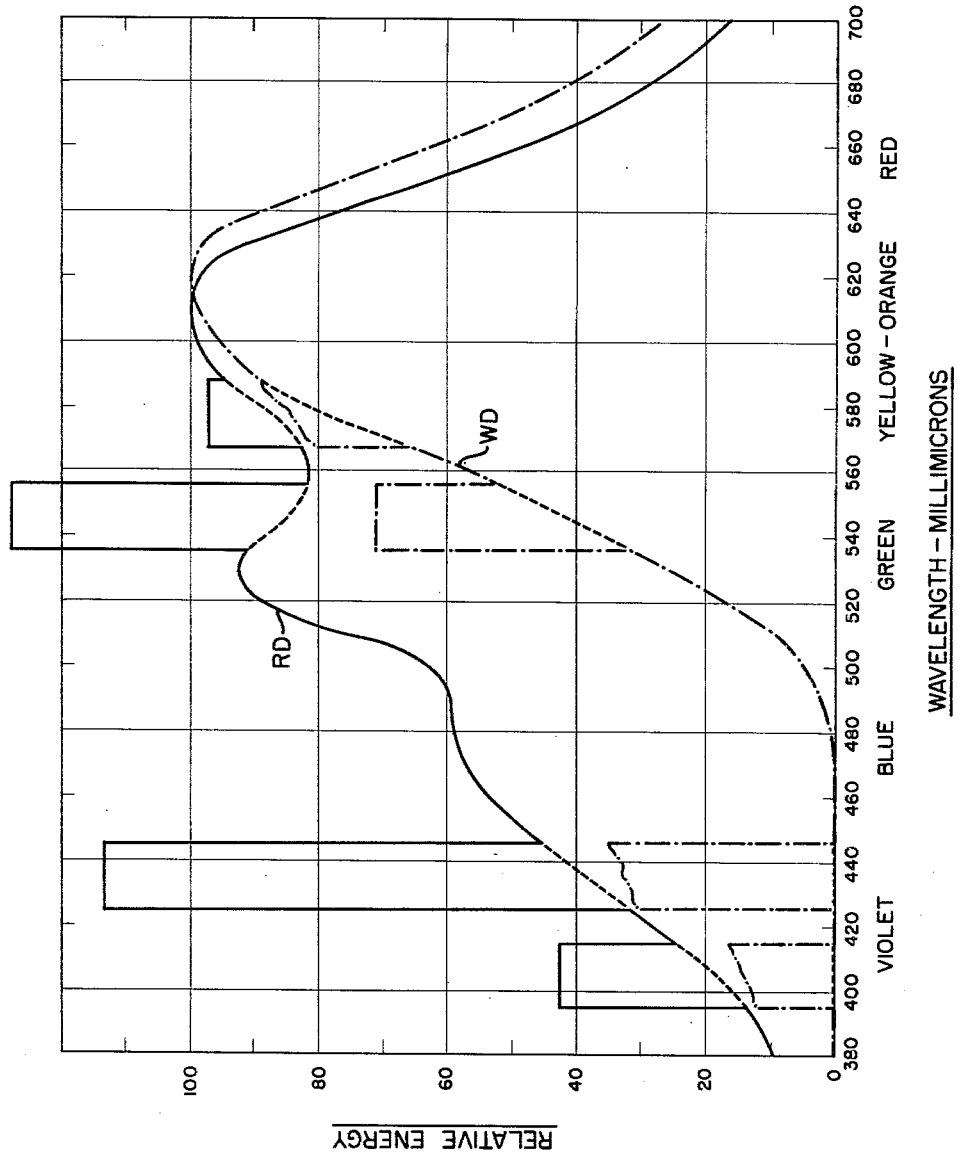
Figure 7G:
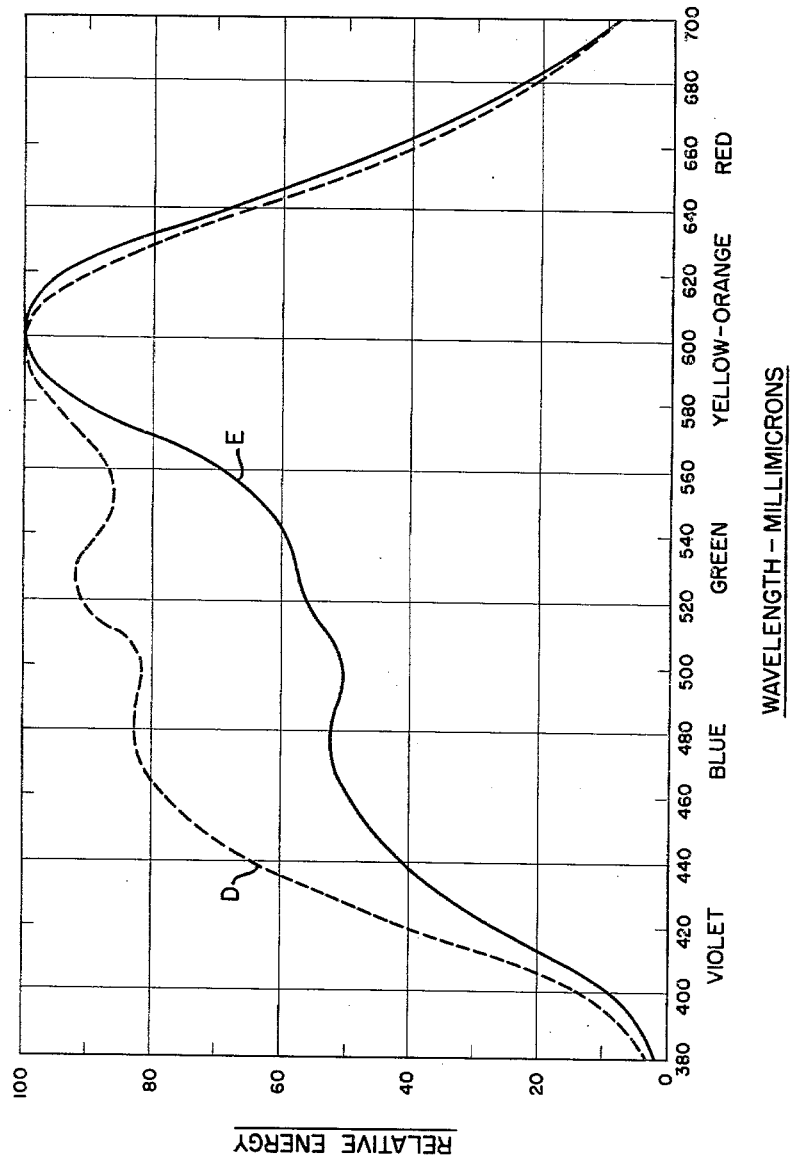
Figure 10:
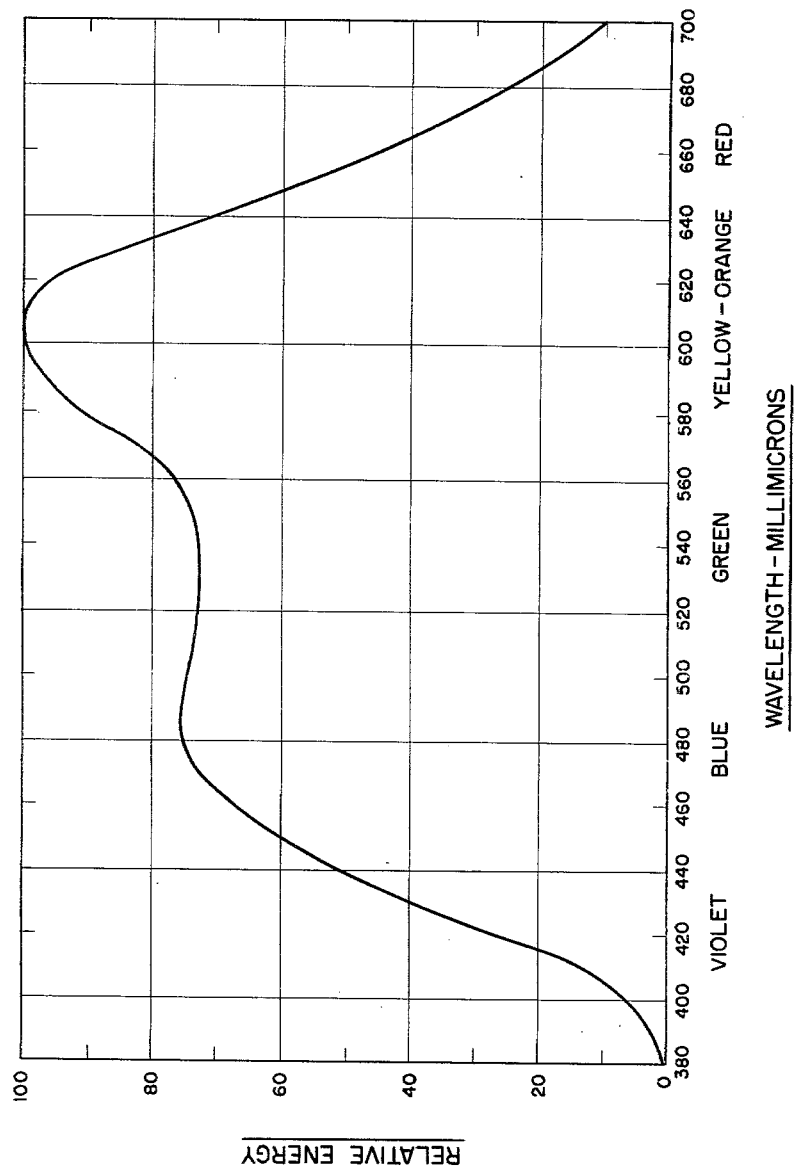
Figure 11:
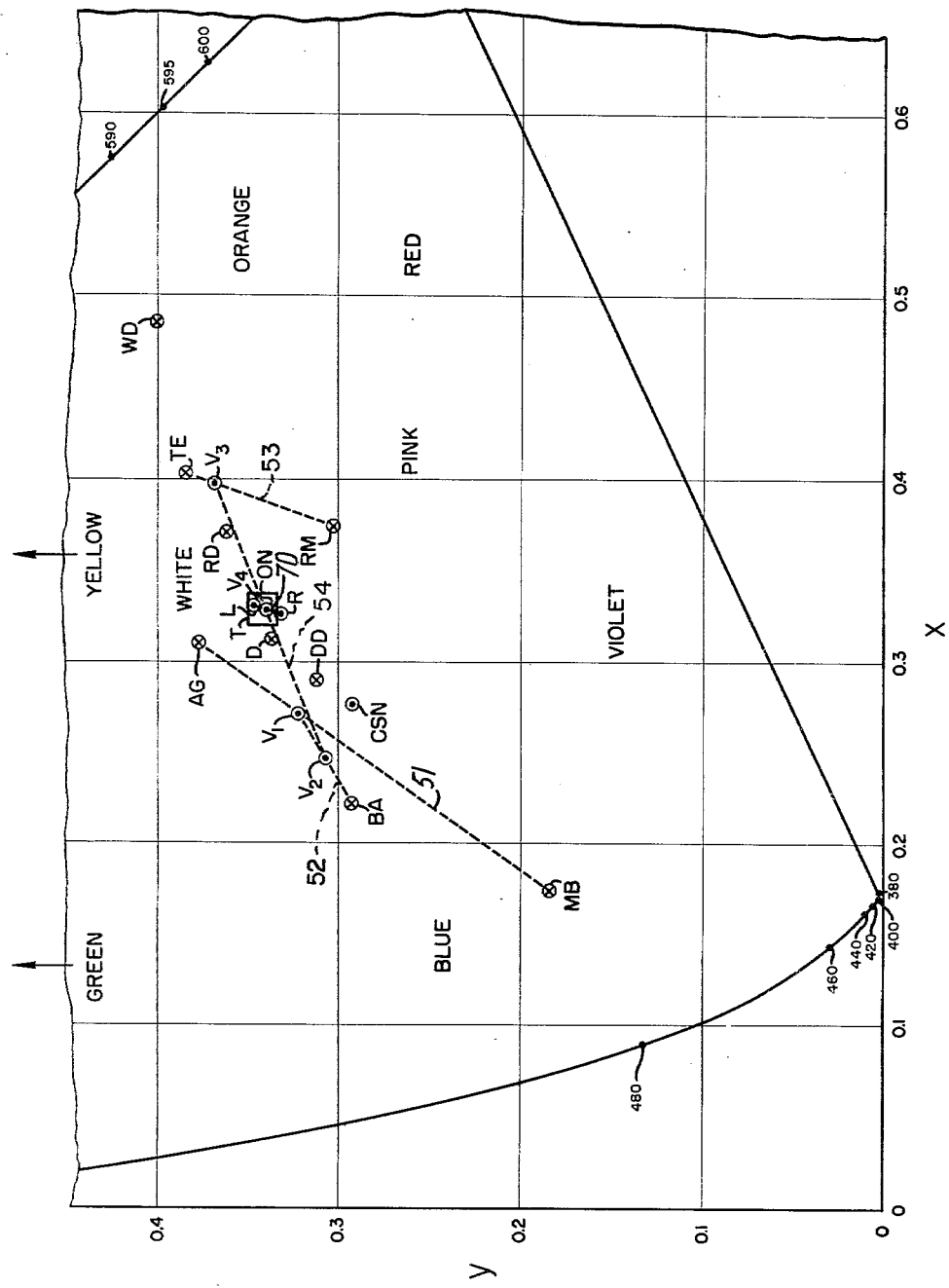
Figure 12:
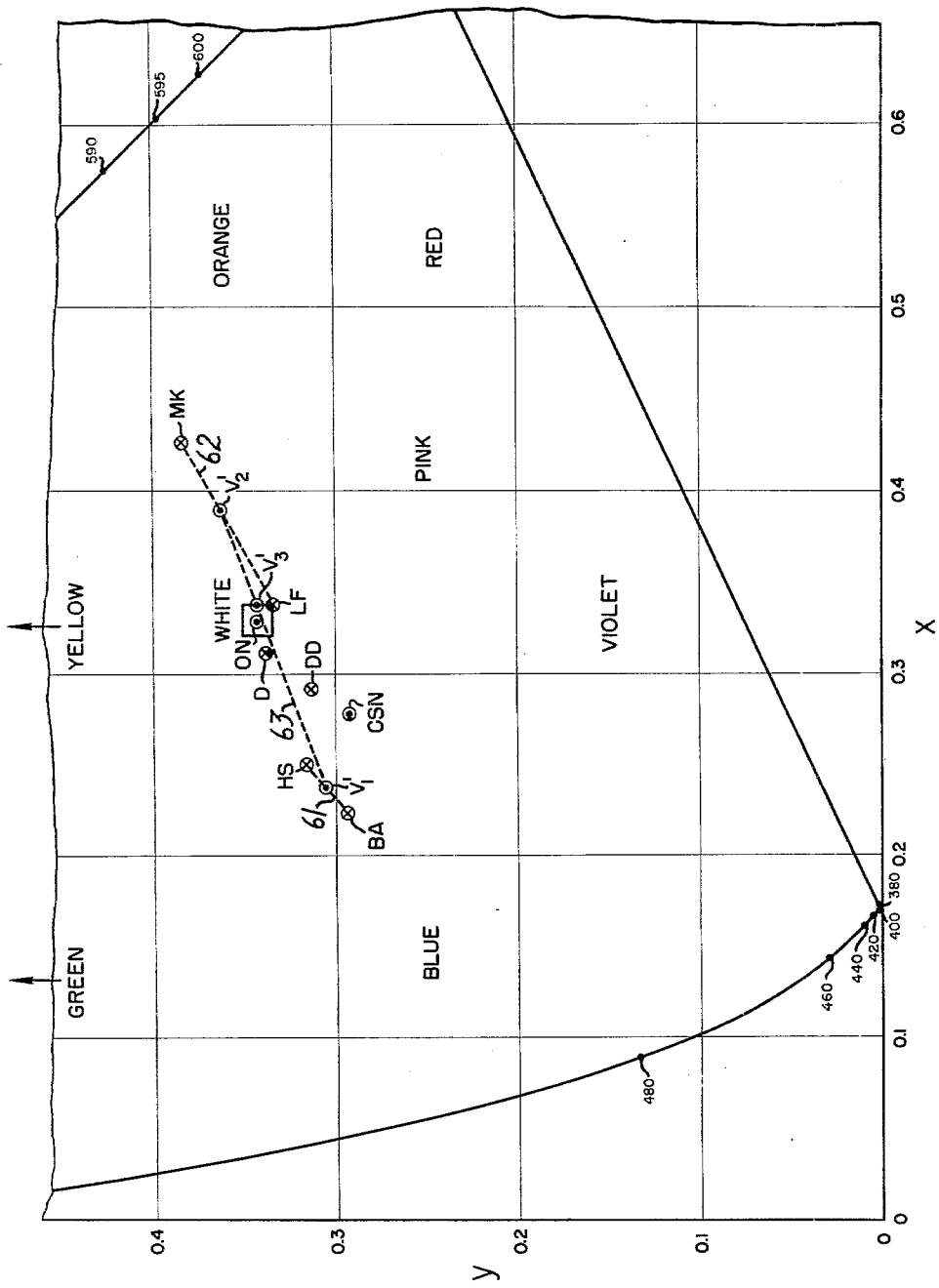

FIG. 7A is a S.E.D. curve for the TE fluorescent tube;
FIG. 7B is a S.E.D. curve for the BA fluorescent tube;
FIG. 7C is a S.E.D. curve for the MB fluorescent tube;
FIG. 7D is a S.E.D. curve for the AG fluorescent tube;
FIG. 7E is a S.E.D. curve for the RM fluorescent tube;
FIG. 7F shows absolute S.E.D. curves for the RD and WD tubes used in the FIGS. 3 and 4 modifications;

FIG. 7G shows the overall S.E.D. curves for the modifications of FIGS. 3 and 4;

FIG. 8 shows a modification of the fixture of FIGS. 1 and 2 in which six rather than eight fluorescent tubes are employed;

FIG. 9 shows the individual absolute S.E.D. curves for the HS, LF and MK tubes in the FIG. 8 modification;

FIG. 10 is an overall absolute S.E.D. curve for the FIG. 8 modification;

FIG. 11 is a chromaticity diagram applicable to the fixture of FIGS. 1 and 2, the diagram being based on the 1931 I.C.I. Standard Observer and Coordinate System; and FIG. 12 is a like chromaticity diagram applicable to the FIG. 8 modification.

Referring now in particular to FIGS. 1 and 2 of the drawings, those drawings show a lighting unit or fixture containing eight fluorescent lamps of tubes disposed in substantially parallel relationship, four being on each side of a vertical center plane C for the fixture. Any number of such units may be used in combination to provide the quantity of light desired. The specific arrangement of the various flourescent tubes described hereinafter is the optimum for the particular combination of tubes employed in the FIG. 1 embodiment.

A typical light fixture 10 is a rectangular box-like member having elongated side walls 11 and 12, end walls 13 and 14 and a top 15 which may be joined to the walls in any suitable way. A translucent light diffusing plate 19 is detachably positioned at the lower edges of the walls 11 to 14 in any suitable way, as by being edge-supported on inturned lips 20 formed at the lower ends of walls 11 and 12. If desired an egg-crate diffuser may be used in place of a diffuser of the translucent plate type.

Within the box-like member a pair of baffle plates 25 and 25a extend inwardly from the side walls 11, 12 and towards and beneath the transversely opposite, laterally running, downturned edges 21 of a centrally located plate 22 to laterally running upturned edges 23 formed at the inner ends of the plates 25, 25a. The plates 25, 25a support the central plate 22 through channel-like joints formed by welding or otherwise securing the bottoms of the downturned edges 21 to the tops of the underlying plates 25, 25a and by likewise securing the tops of the upturned edges 23 to the bottom of the overlying plate 22. If desired, such joints may be reinforced at various places by laterally spaced bracket members 24 (FIG. 1). Suitable openings (not shown) may be formed for ventilation purposes in the plates 25, 25a, the plate 22 or all of them.

A coating of white, baked-on lacquer is applied to the under surface of the plate 22, the under surfaces of the baffle plates 25 and 25a and the inner surfaces below plates 25, 25a of the wall members 11–14 to render all of these surfaces reflective.

Eight 40-watts fluorescent tubes provide the desired quantity and quality of light to simulate the northlight spectrum. The light provided by each of the fluorescent tubes TE, BA, MB, AG and RM is described and identified by the spectral energy distribution curves shown in FIGS. 7A, 7B, 7C, 7D, and 7E, respectively. To further describe and identify these individual fluorescent tubes, one of the outer two fluorescent tubes, designated RM, produces light in the red-blue range by coating the inner surface of the tube with 75% calcium silicate and 25% magnesium tungstate.

Positioned adjacent the tube RM is a tube designated AG which is coated with 80% calcium halophosphate, 10% zinc silicate and 10% magnesium tungstate to produce light in the pastel green range. Adjacent the tube AG is a tube designated BA having the inner surface coated with calcium silicate for providing light in the light-blue range. Next to the tube designated BA is a tube designated TE which has a coating of calcium halo-phosphate for producing light which is substantially white. This TE tube is followed in order by another TE tube which, in turn, is followed in order by a tube designated MB. The MB tube is coated with magnesium tungstate to produce light in the dark-ble range. Positioned adjacent the tube designated MB is a tube designated BA which is identical to the previously described BA tube. The array of tubes is completed at the right hand end by another TE tube.

The fixture shown in FIGS. 1 and 2 differs structurally from that earlier disclosed in our application Serial No. 744,698 in that the centrally located incandescent bulbs of the earlier fixture have been replaced in the present fixture by the two TE tubes which lie next to and on either side of the vertical center plane C. Otherwise, in both fixtures the fluorescent tube arrays are the same. One operational improvement of the all-fluorescent fixture over the mixed fluorescent and incandescent fixture is that the all-fluorescent fixture provides about 5% greater lumens output from considerably less electrical power (388 watts compared to 451 watts). Further, the all-fluorescent fixture is free of all those other disadvantages which have been previously pointed out as characterizing fixtures employing mixed fluorescent and incandescent light sources.

For convenience and good appearance, it is preferable that, in the fixture of FIGS. 1 and 2, all of the fluorescent tubes lie in the same plane. However, a co-planar relationship between the tubes is not a necessity and, if desired, the tubes may have some other relation as, say, being positioned alternately above and below a mean horizontal plane. The spacing between the tubes is not critical but is preferably as small as is consonant with satisfying the conditions of adequate heat dissipation and of ease of insertion of the tubes. The uniformity of illumination of the diffuser element will improve as the spacing of the diffuser from the tubes is increased. We have found, however, that the described fixture provides good color rendition of an illuminated object irrespective of some areal variation in the color and intensity of the light emanated from the under surface of the diffuser. Hence, the spacing between the tubes and the diffuser is not critical for good color rendition, and uniformity of diffuser illumination is significant only from the point of view of appearance.

As opposed to the above-discussed non-critical features, we have discovered that there is an optimal order of positioning within the tube array of those particular tubes which are used in the eight-tube array of the FIG. 1 embodiment. The criteria which determine this optimal order of positioning will be later described in further detail.

To ensure that only the proper fluorescent tube is inserted in the proper socket, arbitrary letter designations are stenciled on the end 13, as best seen in FIG. 1. Also, the length or distance between the sockets of each fluorescent tube is somewhat shorter than a standard fluorescent tube so that a standard tube cannot be inserted inadvertently. The separation between centers of adjacent tubes may be 2¼". For convenience, the eight tube positions of the described fixture will be designated herein as the positions P1–P8, such positions being indicated in FIG. 2 by the circles of dotted outline appearing below the shown tubes.

To describe even more particularly the light emitted by each of the fluorescent tubes, the color coordinates are specified according to the chromaticity diagram based on the International Commission on Illumination (known as the Agreement of 1931) as follows:

| Lamp Type | X | Y | Z |
|---|---|---|---|
| TE | .401 | .385 | .215 |
| RM | .375 | .304 | .322 |
| BA | .222 | .294 | .484 |
| AG | .310 | .377 | .314 |
| MB | .175 | .184 | .640 |

The ballasts 34 for the fluorescent tubes are preferably mounted on the cental plate 22 in the space between this plate and the top plate 15.

It should be understood that the external configurations and ornamentation of the fixtures can be modified substantially and that a plurality of units can be used in a given area to provide the desired light intensity.

Figure 5:
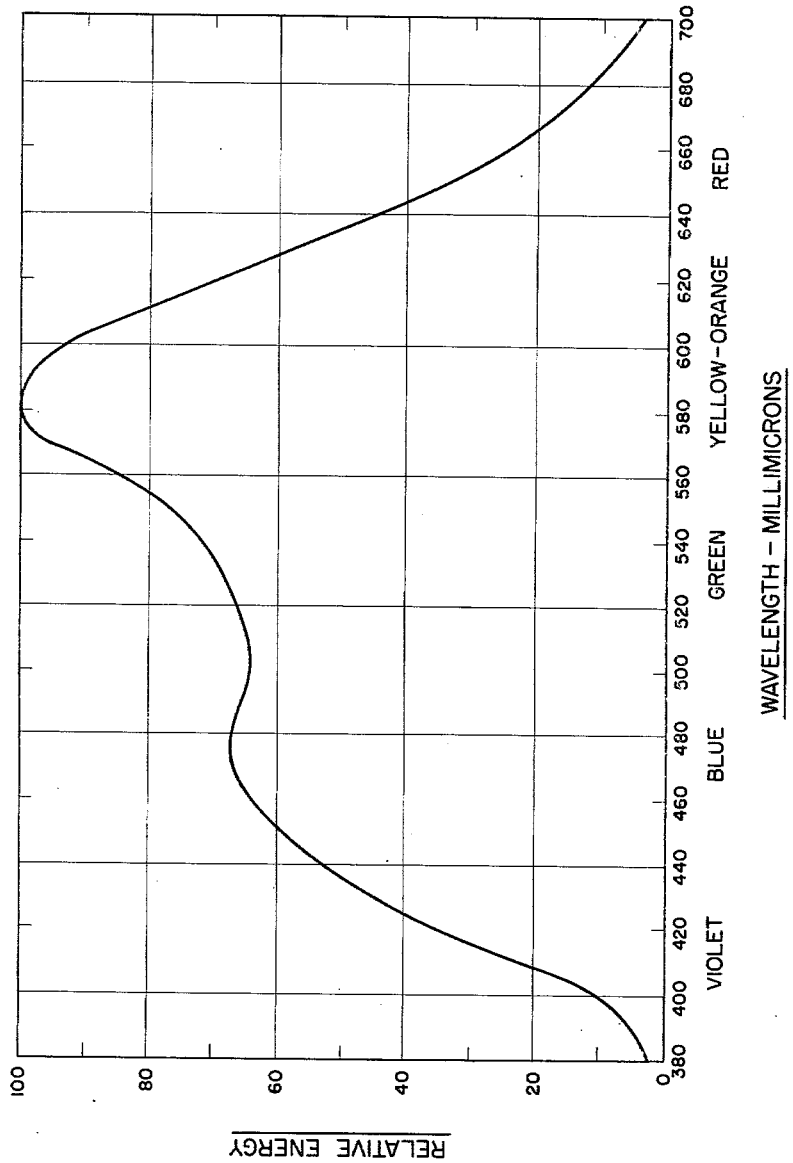
FIG. 5 shows an absolute spectral energy distribution curve for the lighting fixture of FIGS. 1 and 2.
Figure 6:
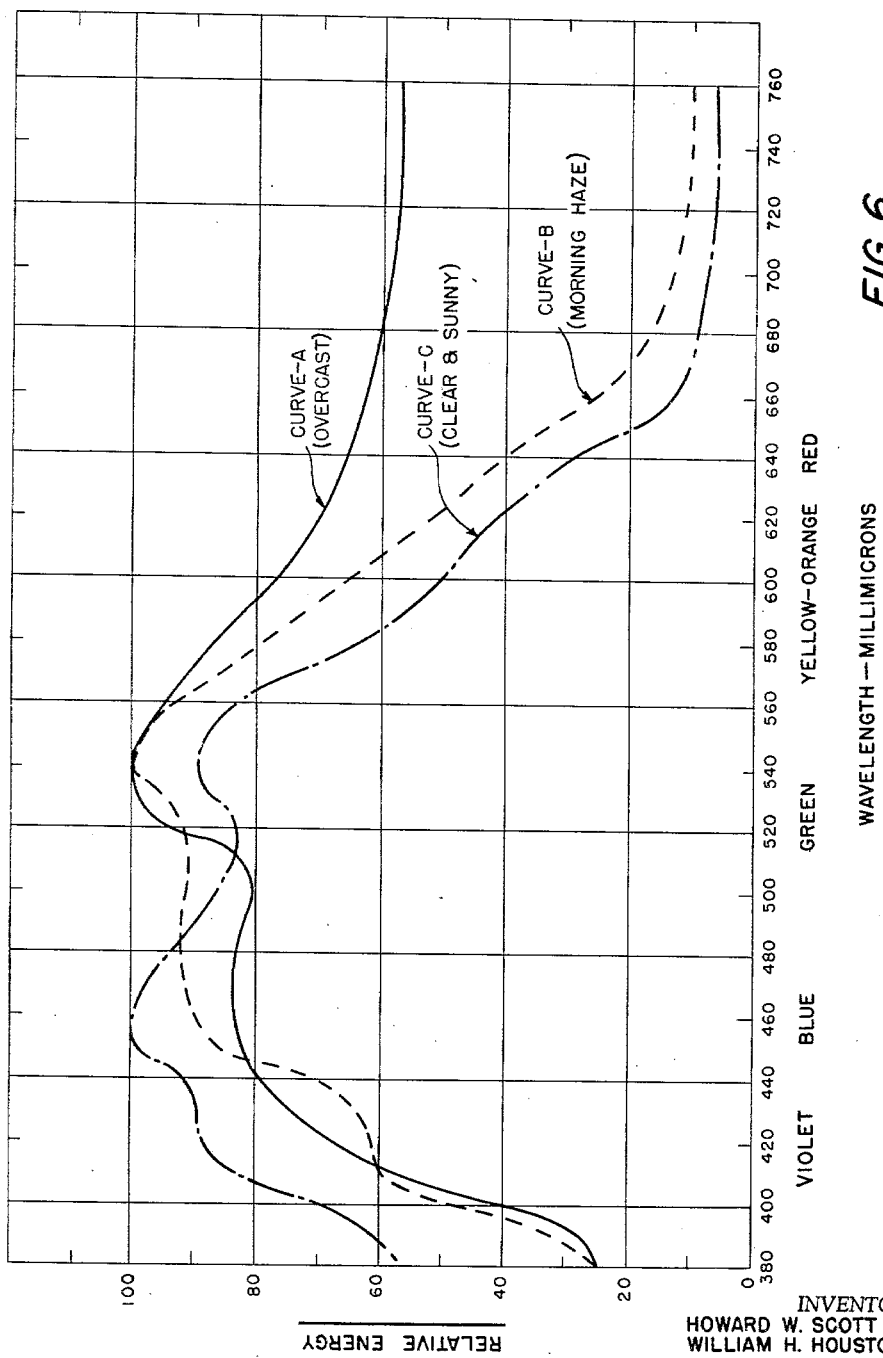
FIG. 6 is an absolute spectral energy distribution (S.E.D.) curve of north sky daylight under three different atmospheric conditions.

It is known that daylight is a continuously varying quantity in both intensity and color, depending upon such factors as, for example, cloud formations, weather and location of the sun. It is also known that for such purposes as color determination and painting, north sky daylight is preferred. As previously pointed out, overcast northlight has a different spectral energy content than clear and sunny northlight in that the overcast northlight is the richer of the two in yellow-orange spectral components. We found that, for many color rendition applications, the overcast northlight gives to an illuminated object a warmer, livelier tone and a "truer" hue than does clear and sunny northlight. For this reason, the quality of the total daylight emitted by the fixture of FIGS. 1 and 2 approximates more closely the north sky daylight available on days which are overcast rather than the north sky daylight available on days which are clear and sunny. An absolute spectral energy distribution curve for the light emitted by the fixture of the present invention is shown in FIG. 5 of the drawings, and the absolute spectral energy distribution curves A, B and C, shown in FIG. 6, represent north sky daylight on days which are overcast, morning haze and clear-sunny, respectively. It is to be noted that the curves shown in FIG. 6 are relative and that the high point of each curve was calibrated as 100 percent. The four rectangular-shaped responses shown on the curve in FIG. 5 are the mercury lines inherent in fluorescent lamps. However, the energy included in these mercury lines is small in comparison to the total light emitted by the fixture, and therefore the effect on the color quality is small also.

Referring again to FIG. 6, it will be seen that the differences between curve C for clear and sunny northlight and curve A for overcast northlight are as follows. Curve C has a maximum at a wavelength value of 460 millimicrons (in the blue region of the color spectrum) whereas curve A has a maximum at 540 millimicrons (in the green-yellow region of the spectrum). The two curves are reciprocal in respect to peaks in that curve C has a subsidiary peak at 540 millimicrons where the maximum peak for curve A occurs, and in that curve A has a subsidiary peak near 460 millimicrons where the maximum peak for curve C occurs. The subsidiary peak for curve C is, however, substantially below the maximum for curve A, and, similarly, the subsidiary peak for curve A is substantially below the maximum for curve C. Beyond 540 millimicrons, as the S.E.D. curves enter the yellow-orange and red spectral region, curve C drops off rapidly and tends towards zero whereas curve A drops off only gradually and still has a relative energy value of over 50% at 760 millimicrons. The differences just pointed out can be summed up by the statement that the spectral energy of overcast northlight lies predominantly in the spectral region whose lower bound is 540 millimicrons whereas the spectral energy of clear and sunny northlight lies in the spectral region whose upper bound is 540 millimicrons. In other words, overcast northlight is much richer in yellow-orange and red spectral energy components than is clear and sunny northlight.

Comparing now the FIG. 5 spectral energy distribution curve for the fixture of FIGS. 1 and 2 with the S.E.D. curves A and C of FIG. 6, it will be seen that the FIG. 5 curve resembles much more closely the curve A of FIG. 6 for overcast northlight than it does the curve C of FIG. 6 for clear and sunny northlight. While the FIG. 5 fixture curve does not conform fully to the overcast northlight curve in that the fixture curve has a maximum at 575 millimicrons value rather than at the 540 millimicron value characterizing the maximum for curve A, the peaking of the fixture curve at a higher wavelength value than the overcast northlight curve is a factor which compensates for the dropping off in the yellow-orange-red region of the fixture curve at a more rapid rate than the drop off in this region of the curve for natural overcast northlight. Because of the similarity between the FIG. 5 S.E.D. curve for the fixture and the S.E.D. curve A for natural overcast northlight, the fixture of FIGS. 1 and 2 is adapted to give a good simulation of overcast northlight, albeit the light from the fixture is just a bit "cooler" in appearance than natural overcast northlight.

FIG. 3 is a representation of the fixture of FIGS. 1 and 2 as modified to include an array of tubes which is somewhat different than the previous array which was formed, in order, of the tubes RM–AG–BA–TE–TE–MB–BA–TE. The difference in the arrays lies in the replacement of the three TE tubes in positions P4, P5 and P8 of the FIG. 1 array by three RD tubes in the FIG. 3 modification. Operationally speaking, the effect of such replacement is to produce from the FIG. 3 array a light which is slightly richer in the yellow-orange spectral energy than the light from the FIG. 1 array and which, thus, is somewhat "warmer" than the light from the FIG. 1 array.

A further increase in degree of "warmth" in the tone of the emitted light is provided by the modification of the FIG. 1 fixture which is represented by FIG. 4. In this last-named modification the three TE tubes at positions P4, P5 and P8 of the FIG. 1 array are replaced by a WD tube at position P4, another WD tube at position P5 and an RD tube at position P8.

In addition to the tube combinations which have been specifically described, it has been found that there are a number of other tube combinations which may be employed to simulate natural northlight with varying degrees of warmth, and which require the changing of only the tubes in the P4, P5 and P8 positions in order to switch from one combination to another. The specifically described combinations and the mentioned other combinations are listed in order of increasing warmth as follow:

| P1 | P2 | P3 | P4 | P5 | P6 | P7 | P8 | |
|---|---|---|---|---|---|---|---|---|
| RM | AG | BA | TE<br>TE<br>RD<br>RD<br>WD<br>WD | TE<br>RD<br>RD<br>WD<br>WD | MB | BA | TE<br>TE<br>RD<br>RD<br>RD<br>WD | (Fig. 1)<br>(Fig. 3)<br>(Fig. 4) |

It will be noted that all of the above-listed combinations are different combinations of only seven different types of tubes, namely, the RM, AG, BA, TE, MB, RD and WD tubes. The ability to form small gradations in the "warmth" of simulated northlight from such a limited number of tube types is a distinct advantage of the described fixture.

The RD tubes employed in the FIGS. 3 and 4 arrays and other of the above-listed combinations are tubes in which the phosphor is commercially identified as Sylvania type #3451, such phosphor being manganese activated calcium orthosilicate together with small amounts of zinc orthosilicate and calcium tungstate. The phosphor of the mentioned WD tubes is manganese activated calcium orthosilicate, and this last-named phosphor is commercially identified as Sylvania type #290.

The individual S.E.D. curves for the RD and WD tubes are given by, respectively, the curves designated RD and WD which are shown in FIG. 7F. The overall S.E.D. curves for the arrays of FIG. 3 and of FIG. 4 appear in FIG. 7G as curves D and E, respectively. Those curves are similar to the curve A of FIG. 6 for natural overcast northlight and to the curve of FIG. 5 for the FIG. 1 array in that (as contrasted to curve C of FIG. 5 for clear and sunny northlight), the maximum energy value for curves D and E occurs well above 460 millimicrons (the peak value for clear and sunny northlight) and, further, the spectral energy components for curves D and E which are predominating are those in the spectral region which includes the yellows, oranges and reds, and which extends from 540 millimicrons on up to the red end of the visible region. Comparing curves D and E to the curve of FIG. 5 for the FIG. 1 array, it will be seen that both curves D and E are relatively somewhat richer in yellow, orange and red spectral energy components than is the FIG. 5 curve, and that, as between curves D and E, the latter will be the richer of the two in such components. This means that, as previously stated, the light output of the FIG. 3 array will be somewhat "warmer" in tone than that of the FIG. 1 tube array, and that that of the FIG. 4 array will be still "warmer."

The tube array shown by FIG. 8 differs from those previously described in that in the FIG. 8 array there are only six tube positions P'1–P'6, and in that the tubes which fill those positions are, save for the BA tube, not of the same type as those used in the various tube arrays of the previously described, eight-tube fixture. The tube array specifically shown in FIG. 8 is the array

HS–MK–LF–LF–MK–BA

This array may, however, be replaced by other tube arrays which include tubes belonging to one or more of the newly mentioned HS, LK and MF tube types, and which are rounded out by tubes belonging to one or more of the tube types which are used in the previously discussed eight-tube fixture. The first mentioned array together with a number of such alternative arrays are listed below in order, from top to bottom, of progressive increase of warmth of tone

| P'1 | P'2 | P'3 | P'4 | P'5 | P'6 |
|-----|-----|-----|-----|-----|-----|
| HS  | TE  | MK  | HS  | MK  | BA  |
| HS  | LF  | LF  | LF  | MK  | BA  |
| HS  | MK  | LF  | LF  | MK  | BA  | (Fig. 8)
| HS  | WD  | LF  | LF  | WD  | HS  |
| HS  | WD  | LF  | MK  | WD  | HS  |

The six-tube fixture of FIG. 8 has the advantage over the previously described eight-tube fixture in that, given a standard size for the diffuser element and for the light reflecting chamber in which the tubes are contained, the tubes of the six-tube fixture may be spaced somewhat further apart to diminish the fraction of the total light emitted by the tubes which is trapped behind the tubes and which, thus, becomes lost for illumination purposes. Because of this diminishment in light trapping, the six-tube fixture provides about as much light as the eight-tube fixture with 75% of the power consumption of the latter. Also, the greater spacing between tubes in the six-tube array facilitates heat dissipation, and the lesser number of tubes reduces maintenance costs. We have found it preferable to employ an array of at least six tubes rather than a lesser number inasmuch as in a fixture with less than six tubes the color blending problem becomes intensified and, further, the total light output per fixture is not as great as is desirable in many color rendition applications.

With respect to the HS, LF and MK tubes which are used in the six tube but not in the eight tube fixture, the phosphor for the HS tube is barium titanium phosphate, that of the LF tube is a mixture of calcium silicate and magnesium tungstate orthosilicate, and the phosphor of the MK tube is a mixture of calcium silicate magnesium tungstate, and zinc orthosilicate. Because of the differences in their respective phosphors, the HS, LF and MK tubes have different S.E.D. curves, those curves being shown in FIG. 9 and each being identified by the symbol for the particular tube to which that curve pertains. A six-tube fixture incorporating the array of FIG. 8 has an overall S.E.D. curve of the form shown in FIG. 10. Comparing this FIG. 10 curve to the curves A and C in FIG. 5 for overcast northlight and for clear and sunny northlight, respectively, it is apparent that the FIG. 10 curve is an approximation of the curve for overcast northlight rather than of the curve for clear and sunny northlight.

For convenience, there is set forth below a table of data pertinent to the invention described herein. The first column of the table lists all the tube types which have hitherto been discussed, such tube types being obtainable by the designations given herein from the Interelectric Company, Warren, Pennsylvania. In addition, the first column lists certain other light sources, i.e., that known to the art as the "daylight" fluorescent tube, that known to the art as the "deluxe daylight" (7500° K.) fluorescent tube, natural clear and sunny northlight and natural overcast northlight. The second column of the table lists, where appropriate, the lumens output of the corresponding light source of the first column, and the third and fourth columns list the X chromaticity coordinate value and the Y chromaticity coordinate value, respectively, of the corresponding light source of the first column. The listed chromaticity coordinate values are for a chromaticity diagram according to the 1931 I.C.I. Standard Observer and Coordinate System. The mentioned table of data is as follows:

| Light Source | Lumens Output | Chromaticity Coordinate Value | |
|---|---|---|---|
| | | X | Y |
| TE | 2,250 | 0.401 | 0.385 |
| BA | 1,850 | 0.222 | 0.294 |
| MB | 1,000 | 0.175 | 0.184 |
| AG | 2,495 | 0.310 | 0.377 |
| RM | 1,500 | 0.375 | 0.304 |
| RD | 1,945 | 0.370 | 0.362 |
| WD | 1,590 | 0.485 | 0.400 |
| HS | 2,025 | 0.250 | 0.317 |
| MK | 1,750 | 0.336 | 0.334 |
| LF | 1,770 | 0.426 | 0.382 |
| D (Daylight) | | 0.311 | 0.338 |
| DD (Deluxe Daylight) | | 0.290 | 0.313 |
| Clear and sunny Northlight | | 0.277 | 0.293 |
| Overcast Northlight | | 0.328 | 0.342 |

For a better appreciation of the differences between the present invention and the endeavors of the prior art, reference is made to the chromaticity diagram of FIG. 11. In this diagram, the TE, BA, MB, AG, RM, RD and WD tubes are, as light sources, plotted in terms of their X and Y chromaticity coordinate values. The tubes just mentioned are all of the various tube types occurring in the tube arrays which have previously been discussed in connection with the eight-tube fixture. In addition to such fluorescent light sources, there appears on the diagram of FIG. 11 a point D which corresponds to the chromaticity coordinate values of the previously mentioned "Daylight" tube, a point DD which corresponds to the chromaticity coordinate values of the aforementioned "Deluxe Daylight" tube, a point CSN representing the chromaticity coordinate values for typical clear and sunny northlight, and a point ON representing the chromaticity coordinate values for typical overcast northlight, the last-named chromaticity coordinate values being taken herein as standard values for natural overcast northlight. The point ON is at the center of a square area T having X chromaticity coordinate values of from 0.320 to 0.336, and having Y chromaticity coordinate values of from 0.334 to 0.350.

The significance of this area T is that, as stated, one of the objects of the invention is to simulate natural overcast northlight by the artificial light from an all-fluorescent fixture. We have found, as a practical matter and insofar as chromaticity coordinate values alone are concerned, that, for many color rendition purposes, a good simulation of this sort may be obtained (and such object of the invention thus realized) whenever the point corresponding to the chromaticity coordinate values of the overall light output from the fixture is a point which is within or on the bounds of the area T. It does not follow from this, however, that if a point corresponding to some particular light output falls somewhat outside the area T, such light output is necessarily entirely unsatisfactory in terms of its chromaticity coordinate values as a simulation of natural overcast northlight. For one thing, natural overcast northlight is not an invariable quantity but instead is somewhat variable in its chromaticity coordinate values as well as in its S.E.D. curve. Furthermore, within those various fields of applications in which the described fixture may be used for color rendition purposes, there is a considerable variance in the stringency of the demand made upon the fixture for exact correspondence between the light derived therefrom and the natural overcast northlight of designated characteristics which the light from the fixture is intended to replace. Still further, color applications differ amongst themselves in respect to the exact characteristics of the natural overcast northlight which is best suited for the rendition. Accordingly, the invention is not necessarily limited only to those fixtures having light outputs whose chromaticity coordinate values define points falling within the area T of FIG. 11.

In the diagram, the point CSN for clear and sunny northlight has an X value of 0.277, whereas the point D for the standard "Daylight" tube has an X value of 0.311, and is thus displaced rightward of the point CSN by only 0.034 unit. This small excess in X value of the light from the "Daylight" tube relative to clear and sunny northlight provides a basis for an explanation of why, in the prior art, attempts to simulate clear and sunny northlight by artificial light, it was the practice to supplement with incandescent bulbs the combination employed by the prior art of "Daylight" tubes with other fluorescent tubes having X values lower than that of the daylight tube, i.e., having light of a more bluish cast than that of the "Daylight" tube. To wit, when such tubes with light of bluish cast were added to one or more "Daylight" tubes for the purpose of filling out the S.E.D. curve of the fixture so as to have such curve more closely resemble the S.E.D. curve for clear and sunny northlight, the effect of such addition was to render the X value of the light from the combination less than the X value of clear and sunny northlight. It follows that, in order to restore such X value for light from the combination to approximately the X value for the mentioned northlight, it was necessary to add further to the combination a source of light which was relatively rich in orange and red spectral energy components. Incandescent bulbs were readily available and were commonly known to emit light of such character. Hence, incandescent bulbs were resorted to for the purpose of rounding out the light sources of the combination.

Because of its X value of 0.311, the point D for the "Daylight" tube is located in the FIG. 11 diagram to the left of the area T for the reason that the lowest X value of area T is 0.320. As stated, the area T represents the area of good simulation for most purposes of "standard" overcast northlight. A necessary consequence of this leftward location of point D relative to area T is that it is impossible to provide a good simulation of the overcast northlight represented by point ON through the employment of "Daylight" tubes either alone or in any combination with other fluorescent tubes which all have X chromaticity coordinate values less than the X value for the "Daylight" tube.

Applicants' invention is adapted, in the following manner to simulate overcast northlight while avoiding the use of incandescent bulbs. As in the prior art, the individual light outputs of some of applicants' fluorescent tubes have X chromaticity coordinate values which are less than or at most equal to 0.311 which is the X vaue for the "Daylight" tube. Others, however, of applicants' fluorescent tube each provide light having an X value of greater than 0.311, and the total light output of such latter tubes is enough to pull the X valve for the overall light from the fixture into the range of 0.320–0.336, i.e. the range of X values for the area T. Further, the individual Y chromaticity coordinate values for all tubes of the fixture are so weighted by the lumens output values of such tubes and, also, are so related to each other that the Y value for the overall light from the fixture falls within the range of 0.324–0.350 which is the Y range for the area T. Finally, the S.E.D. curves of the various tubes of the all-fluorescent fixture are so matched that, when each such curve is weighted for the particular lumens output value of the tube to which such curve belongs, all of such curves blend together to provide for the fixture an overall S.E.D. curve which, to a reasonable approximation, corresponds with the S.E.D. curve for overcast natural northlight. The result is a light which is artificial in origin, but which, nonetheless, is indistinguishable from overcast northlight for most color rendition purposes.

Going further into the details of the light blending process whereby applicant's fixture provides its simulation, the light outputs from the tubes of such fixture cooperate with each other in a manner for which a simplified explanation can be graphically given on the diagram of FIG. 11, for, say, the tube array incorporated in the described FIG. 1 embodiment and consisting of the tubes RM, AG, BA, TE, TE, MB, BA, and TE. To elaborate, consider first the MB, AG and BA tubes which have an X value of less than 0.311, and assume among those last-named tubes that the one MB tube with a lumens output of 1000 and the one AG tube with a lumens output of 2495 cooperate to form a virtual light source $V_1$ whose light output equals the sum of the lumens outputs of MB and AG, or, in others words, 3495 lumens. To locate the light source $V_1$ on the FIG. 11 diagram, there is drawn between points MB and AG a straight line segment 51. This line segment represents the locus of the chromaticity coordinate values of all light mixtures which can be derived by combining an MB tube of any given lumens output with an AB tube with any other given lumens output.

The position along this line segment of the virtual light source $V_1$ is determined by a weighting procedure which is carried out as follows. First, the length of line segment 51 is measured in, say, the units of measure used in the FIG. 11 diagram. In the present instance, this length is found to be 236 units. Now, evidently, the point $V_1$ will lie closer along line segment 51 to the point AG than to the point MB inasmuch as the tube AG has an output value of 2495 lumens whereas that of tube MB is only 1000 lumens. The exact distance of separation in the mentioned units of point $V_1$ from point AG is calculated by multiplying the 236 unit value of the whole line segment 51 by the ratio of the lumens output of tube MB to the sum of the lumens outputs of tubes MB and AG, i.e., the ratio 1000/3495. As so calculated, the distance of separation is 68 units. This distance is laid off graphically from point AG along line segment 51 to locate the point for the virtual light source $V_1$ in the position shown in FIG. 11.

As stated, the point $V_1$ represents on the FIG. 11 diagram the combined light effects of the MB and AG tubes in the FIG. 1 tube array. The effect in this array of the two BA tubes is next determined by finding on the FIG. 11 diagram the location of a virtual light source $V_2$ which is representative of the combining together of the light output of the two BA tubes and of the virtual light source $V_1$. The point corresponding to source $V_2$ is located by the same graphical procedure as that before described, namely, by drawing a line segment 52 between the points BA and $V_1$, measuring the length of segment 52, calculating the displacement of point $V_2$ along segment 52 from the point $V_1$ in view of the 3495 lumens value assigned to $V_1$ and the 3700 lumens value assigned to point BA (by virtue of the fact that such BA point represents two BA tubes each with an output of 1850 lumens), and by laying off such displacement on segment 52 to thereby position the point $V_2$ at the place shown in FIG. 11. Such point $V_2$ has an assigned value of 7195 lumens, and the chromaticity coordinate values of this point are the values for the overall light derived from all of the MB, AG and BA tubes, i.e., all of the tubes of the FIG. 1 array which emit light having an X value of less than the 0.311 value for the "Daylight" tube.

Turning now to the RM and TE tubes of the array, the light outputs of those tubes are considered as combining together to provide a virtual light source $V_3$. The location of point $V_3$ on the FIG. 11 diagram is determined by drawing a line segment 53 between the points RM and TE and finding the position of the points $V_3$ on such line segment in the manner which has been heretofore described. This point $V_3$ has assigned thereto a value of 8250 lumens, and the point is representative of the chromaticity coordinate values of the overall light produced by all the tubes in the FIG. 1 array which have an X value greater than the value of 0.311 for the "Daylight" tube.

Finally, the points $V_2$ and $V_3$ of the FIG. 11 diagram are employed to find a point $V_4$ which is representative in terms of chromaticity coordinate values of the light emitted by all tubes of the FIG. 1 array. This point is located on the FIG. 11 diagram by the same graphical procedure as used before, namely by drawing between points $V_2$ and $V_3$ a line segment 54, and so on. As located by such procedure, the point $V_4$ coincides within the limits of graphical accuracy to the point ON which represents the chromaticity coordinate values for "standard" overcast northlight. Therefore, insofar as chromaticity coordinate values are concerned, the light from the FIG. 1 array is a very close approximation to natural overcast northlight.

While the graphical constructions which have been described provide an insight as to the manner in which the tubes of the FIG. 1 array cooperate together to simulate overcast northlight, such constructions are, quantitatively speaking, only roughly accurate. Furthermore, while the constructions provide an explanation of why the X and Y chromaticity coordinate values of the light from the FIG. 1 fixture are in close correspondence with the X and Y chromaticity coordinate values of the overcast northlight which is taken as a standard, it is to be understood that a good simulation of such northlight requires, in addition, that the S.E.D. curve for the fixture be an approximation of the S.E.D. curve for such natural northlight. In other words, a matching of the chromaticity coordinate values of the artificial light with those of the nautral light to be simulated is only one of the factors involved in obtaining a good simulation by such artificial light of such natural light.

The chromaticity coordinate points for the RD and WD tubes are plotted on the FIG. 11 diagram. Hence, graphical procedures of the sort explained above may be employed to determine the X and Y chromaticity coordinate values of light derived from any of the other tube combinations which have been described as being suitable for use in the eight-tube fixture. In the interest of conciseness, such additional graphical constructions for the eight-tube fixture have been omitted.

In FIG. 12 there is shown the graphical construction for the array of the six-tube fixture which consists of the fluorescent tubes HS, MK, LF, LF, MK, and BA. In the FIG. 12 diagram, the various line segments are designated as 61, 62, 63, respectively, and the virtual light sources on those line segments are designated as, respectively, the sources $V_1'$, $V_2'$ and $V_3'$. From the the explanation which has heretofore been given, the significance of those line segments and virtual light sources should be evident. The point $V_3'$ represents the chromaticity coordinate values of the overall light derived from the tube array of FIG. 8. This point $V_3'$ is located approximately on the righthand vertical margin of the area T. Similar graphical procedures may be employed to determine the chromaticity coordinate values of the light derived from the other tube arrays which have been disclosed herein as suitable for the six-tube fixture.

The foregoing discussion of graphical procedures has been concerned with the problem of obtaining a proper spectral blending of the light outputs of all the tubes in a given tube array irrespective of the order in which such tubes are positioned therein. In other words, the foregoing discussion disregards the factor of tube position. We have found, however, that the order of positioning of the tubes within an array does play an important role in the degree to which light projected from the fixture will be of uniform characteristic in the different areas of the entire zone which is illuminated by the fixture. In general, we have discovered that the end of obtaining uniformity of the light within the illumination zone is best realized by approximately balancing the light output of the fixture about the central plane C while avoiding the addition to the fixture of tubes which are used merely for balancing purposes as opposed to being necessary for the purpose of attaining the desired simulation of natural light. What is meant by such balance about the central plane C will now be explained.

One aspect of the balance which is sought is an approach to equalization in the total amounts of the light outputs emitted by the two sets of tubes on, respectively, the lefthand and the righthand sides of the center plane C. The purpose of this "lumens" balance is to assure that in the zone of illumination the intensity of the light on opposite sides of the plane C will be as close as possible to uniform. The tube array of FIG. 1 attains this objective relatively well inasmuch as the RM, AG, BA and TE tubes to the left of plane C provide a total output of 8095 lumens, whereas the TE, MB, BA and TE tubes to the right of plane C provide a total output of 7350 lumens, whereby the difference between the two outputs is only 745 lumens. A lumens balance of this sort is referred to herein as an optimal balance when, for a given order of tubes in an array, the difference between the total light outputs of the lefthand and righthand tubes is smaller than the difference between such outputs which would result if any present lefthand tube and any present righthand tube were to be interchanged in position. The tubes of the array of FIG. 1 are in that positional order which does obtain such optimal lumens balance. In general, however, the importance of obtaining the optimal lumens balance must be weighed against the importance of obtaining a relatively good balance in the spectral characteristics of the overall light outputs from the lefthand and the righthand sets of tubes. Such "spectral" balance is obtained in the FIG. 1 tube array as follows.

In such tube array, the tubes RM, AG, BA and TE which are to the left of plane C can be considered as acting together to form a single virtual light source L having an output of 8095 lumens. The point L on the FIG. 11 diagram corresponding to such virtual light source is located by graphical procedures similar to those previously described. As shown, the point L is within area T and is slightly above and to the right of the point $V_4$ which is representative of the overall light from the entire FIG. 1 array.

In like manner, the TE, MB, BA and TE tubes which are to the right of plane C can be considered as acting together to form a virtual light source R having an output of 7350 lumens. As shown in FIG. 11, the point R which corresponds to this last-named light source is located by the described graphical procedures just outside the area T at a position slightly below and to the left of the point $V_4$. The positional relation of the points L, $V_4$ and R is such that point $V_4$ lies approximately on a line segment 70 extending between the points L and R. Furthermore, the point $V_4$ is somewhat closer to the point L than it is to the point R. The described position of point $V_4$ relative to points L and R is what is to be expected inasmuch as it is the position which would be obtained by treating point $V_4$ as representative of a virtual light source derived by the combining of the light outputs of the virtual sources L and R, and by thereupon locating the position of point $V_4$ relative to points L and R in accordance with the aforementioned graphical procedures.

The distance of separation between the points L and R is a measure of the degree of spectral balance attained by the lefthand and righthand tubes of an array thereof, the relationship being that the smaller such distance, the better will be such spectral balance. A good spectral balance is desirable in order to assure that, within the zone of illumination of the array, the light which falls to the left of center plane C has the same spectral characteristics as the light falling to the right thereof. There is no absolute rule as to how good the spectral balance must be. A convenient empirical rule, however, is that the spectral balance is satisfactory when the distance of separation between the points L and R in the units used in the FIG. 11 diagram does not exceed 45 units, this figure being about twice the length of the diagonal for the square area T. The basis for such empirical rule is that, if the points L and R were to be separated by a distance greater than twice the length of the mentioned diagonal (and assuming that points L and R are equal in assigned lumens value), then, because of the inherent relationship between the positions of the points $V_4$, L and R, when point $V_4$ falls, as desired, within the area T, then neither one of the points L and R can fall within this area. To state it in a more practical way, if the distance of separation between the points L and R exceeds twice the length of the diagonal of the square area T, then even though it might be the case that, overall, the light from the fixture provides a simulation of overcast northlight within the limits set by area T, neither the light from the lefthand side of the fixture nor the light from the righthand side of the fixture could separately provide such simulation within such limits.

Another criterion for determining the adequacy of spectral balance is whether or not such balance is "optimal" in the sense in which such word was used before. Specifically, what is meant by an optimal spectral balance is that such balance is obtained when, for a given positional order of tubes in an array, the distance of separation between the points L and R in FIG. 11 is smaller than the distance of separation between those points which would result if any present lefthand tube and any present righthand tube were to be interchanged in position. The positional order of the tubes in the array of FIG. 1 obtains an optimal spectral balance of this sort.

While the tube array of FIG. 1 has been used as an example in connection with the foregoing discussion concerning the symmetrical balancing about vertical center plane C of the intensity and of the spectral characteristics of the light emanated from the fixture, it will be appreciated that the same balancing considerations apply also to the other tube arrays which have been disclosed.

The S.E.D. curves which are shown in various of the drawings were measured by a Beckman model DK–1 spectral photometer which was modified to utilize a type 6217 photomultiplier. In making the measurement the fixture was placed in a vertical position with the tubes thereof horizontal, and the face of the fixture was located four feet from the monochromator slit of the spectral photometer. In the instance where the measurement was of the S.E.D. curve of an entire tube array within the fixture, the height of the fixture was adjusted so that, the slit successively observed five separate light zones, namely the zones six and three inches above the center of the fixture face, the center zone, and the zones located three and six inches below the center of the fixture face. The five curves so obtained for any measured tube array were averaged and corrected using calibration data obtained with the Standard of Spectral Radiant Flux to provide the final S.E.D. curve for the fixture. The several chromaticity coordinate values set forth herein were, unless otherwise indicated, calculated by standard colorimetry procedures from the E.D. curves which were so measured. Due to limitations in such colorimetry procedures, the chromaticity coordinate values are somewhat approximative but are as accurate as such procedures will allow.

The above-described embodiments being exemplary only, it will be understood that the invention disclosed herein comprehends embodiments differing in form and/or detail from those specifically described. For example, the invention is of application in the instance where a tube array consists of an odd number of tubes, and wherein, accordingly, the center plane for the fixture divides the central tube into lefthand and righthand halves which are considered, for balancing purposes, to be separate light sources on opposite sides of the center plane.

We claim:

1. Apparatus comprising, a lighting fixture, a plurality of at least six light sources in said fixture and consisting entirely of fluorescent tubes, a plurality of at least three compositionally different phosphors separately contained by said tubes, a first of said three contained phosphors being included among a minority of said tubes characterized by fluorescence properties with an X chromaticity coordinate value of less than 0.277, a second of said three contained phosphors being included among a larger number of said tubes characterized by fluorescence properties with an X chromaticity coordinate value of more than 0.328, and the third of said three contained phosphors having a fluorescence property with an X chromaticity coordinate value intermediate those of the fluorescence properties of said first and second phosphors, and the variation with wavelength in the fluorescent property of each tube and the lumens output rating thereof being in weighted relation with the same properties of each of the other tubes to be adapted together to produce from all said tubes an overall light output which has an X chromaticity coordinate value in the range extending between and including the X values of 0.320 and 0.336, and which has a Y chromaticity coordinate value extending between and including the Y values of 0.334 and 0.350 and which, further has a spectral energy distribution curve which is simulative of natural overcast northlight.

2. Apparatus comprising, a lighting fixture, a plurality of at least six light sources in said fixture and consisting entirely of fluorescent tubes, a plurality of at least three compositionally different phosphors separately contained by said tubes, a first, a second and a third of said three different contained phosphors having the property of maximal fluorescence at a visible wavelength in, respectively, the blue-violet spectral region at a first wavelength value below 500 millimicrons, the yellow-orange-red spectral region at a second wavelength value above 600 millimicrons, and the spectral region intermediate said first and second wavelength values, the first of said three phosphors being included among a minority of said tubes characterized by fluorescence properties characterized with an X chromaticity coordinate value of less than 0.277, the second of said three phosphors being included among a larger number of said tubes characterized by fluorescence properties with an X chromaticity coordinate value of more than 0.328, and the third of said three contained phosphors having a fluorescence property with an X chromaticity coordinate value intermediate those of the fluorescence properties of said first and second phosphors, and the variation with wavelength in the fluorescent property of each tube and the lumens output rating thereof being in weighted relation with the same properties of each of the other tubes to be adapted together to produce from all said tubes an overall light output of which the spectral energy distribution curve is simulative of that of natural overcast northlight and has a highest peak in the visible wavelength range including and extending above 540 millimicrons, and of which the X chromaticity coordinate value lies within the range extending between and including the X value of 0.320 and 0.336, and the Y chromaticity coordinate value lies within the range extending between and including the Y values of 0.334 and of 0.350.

3. Apparatus comprising, a lighting fixture, a plurality of at least six light sources in said fixture and consisting entirely of fluorescent tubes which are of at least three different types in respect to the composition of the phosphor contained by each and, of which the number of types is lesser than the number of tubes and is indivisible by two into the total number of tubes, the contained phosphors of said three different tube types having the property of maximal fluorescence at a visible wavelength in, respectively, the blue-violet spectral region at a first wavelength value below 500 millimicrons, the yellow-orange-red spectral region at a second wavelength value above 600 millimicrons, and the spectral region intermediate said first and second wavelength values, said light sources being divided into a first set on one side of the central plane of said fixture and a second different set on the other side of said central plane, said plurality of sources being disposed in positional order relative to said plane to yield a distance of separation on a chromaticity diagram of at most 45 units between the two points representing the X, Y chromaticity coordinate values of the separate total light outputs adapted to be provided by, respectively, said first and second sets of sources, and the variation with wavelength in the fluorescent property of each tube and the lumens output rating thereof being in weighted relation with the same properties of each of the other tubes to be adapted together to produce from all said tubes an overall light output having a spectral energy distribution curve which is simulative of that of natural overcast northlight.

References Cited by the Examiner

UNITED STATES PATENTS

| | | | |
|---|---|---|---|
| 1,391,585 | 9/21 | Sheringham | 240—1.1 |
| 2,003,342 | 6/35 | Cavanaugh. | |
| 2,269,819 | 1/42 | Isenberg | 313—109 |
| 2,725,461 | 11/55 | Armour | 240—1.1 |
| 2,748,303 | 5/56 | Thorington | 313—25 |
| 2,831,966 | 4/58 | Porteous | 240—1.1 |
| 2,836,707 | 5/58 | Stitt | 240—1.1 |
| 2,966,605 | 12/60 | Harris et al. | 313—109 |
| 3,003,388 | 10/61 | Hunter et al. | 88—14 |

FOREIGN PATENTS

| | | |
|---|---|---|
| 993,915 | 8/51 | France. |
| 798,884 | 7/58 | Great Britain. |

NORTON ANSHER, *Primary Examiner.*